United States Patent [19]
Allard

[11] 3,983,986
[45] Oct. 5, 1976

[54] CIRULATING CONVEYOR
[75] Inventor: Jean Francois Lacombe Allard, Sens, France
[73] Assignee: Automatisme et Technique, Arcueil, France
[22] Filed: Nov. 5, 1974
[21] Appl. No.: 520,966

[30] Foreign Application Priority Data
Nov. 9, 1973  France .............................. 73.39839

[52] U.S. Cl. ............................... 198/321; 198/645; 198/844
[51] Int. Cl.² ........................................... B23Q 7/00
[58] Field of Search ............ 198/19, 20 R, 129, 130, 198/131, 189, 194, 195, 181, 110

[56] References Cited
UNITED STATES PATENTS

| 426,890 | 4/1890 | Westphal | 198/181 |
| 2,671,552 | 3/1954 | Miller | 198/110 |
| 2,932,376 | 4/1960 | Millington | 198/19 |
| 3,211,279 | 10/1965 | Smith | 198/181 |
| 3,262,549 | 7/1966 | Stewart et al. | 198/195 |
| 3,344,521 | 10/1967 | Fievet | 198/131 |

*Primary Examiner*—John J. Love
*Assistant Examiner*—Joseph E. Valenza
*Attorney, Agent, or Firm*—Parmelee, Johnson & Bollinger

[57] ABSTRACT

A continuously circulating work processing conveyor comprising at least one processing drum of which peripheral compartments receive work carriages, each work carriage being linked to the following work carriage by a connection of which the length between any two consecutive carriages is always substantially the same and which is disposed so that the various carriages can be oriented differently from one another about axes perpendicular to their plane of advance.

9 Claims, 10 Drawing Figures

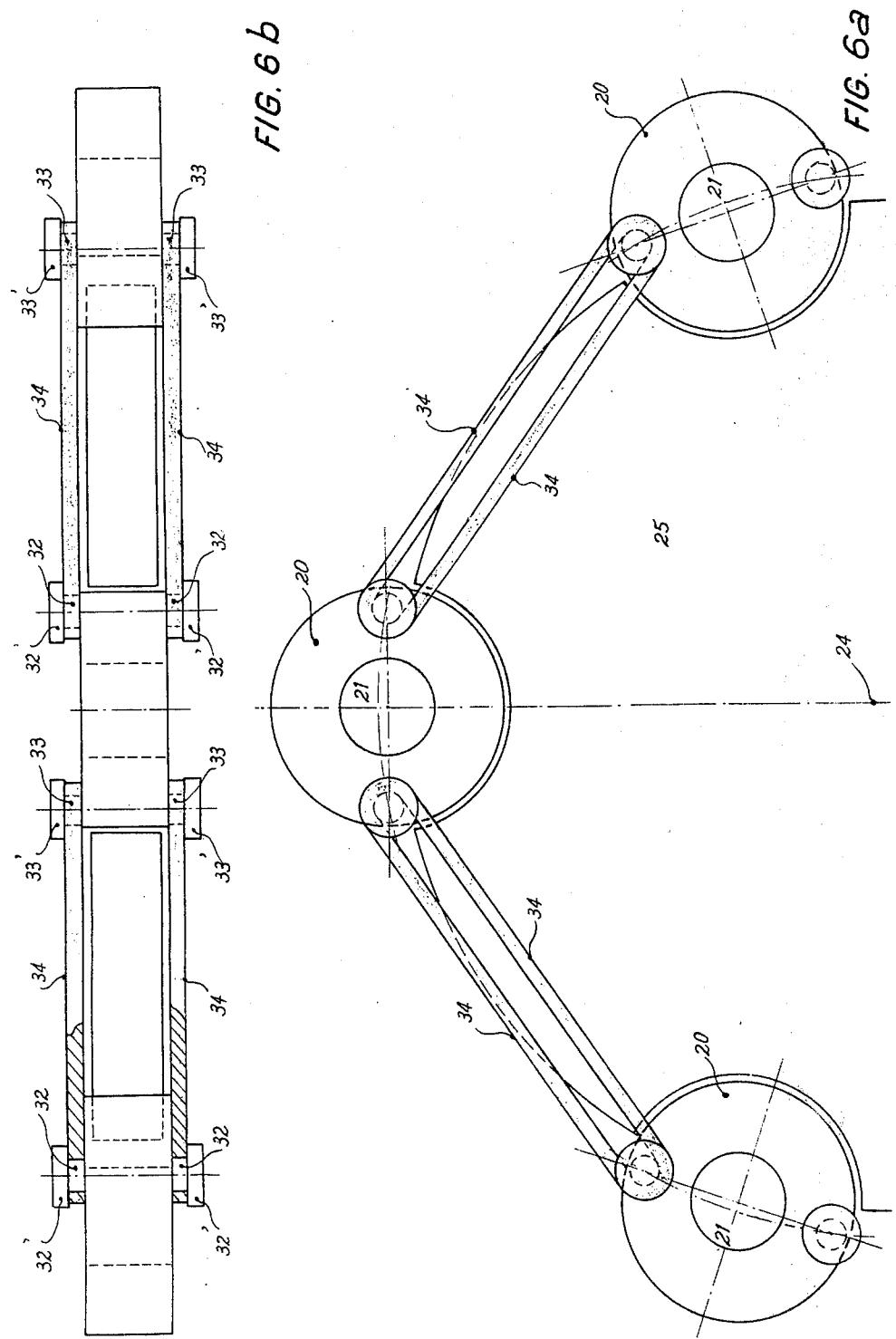

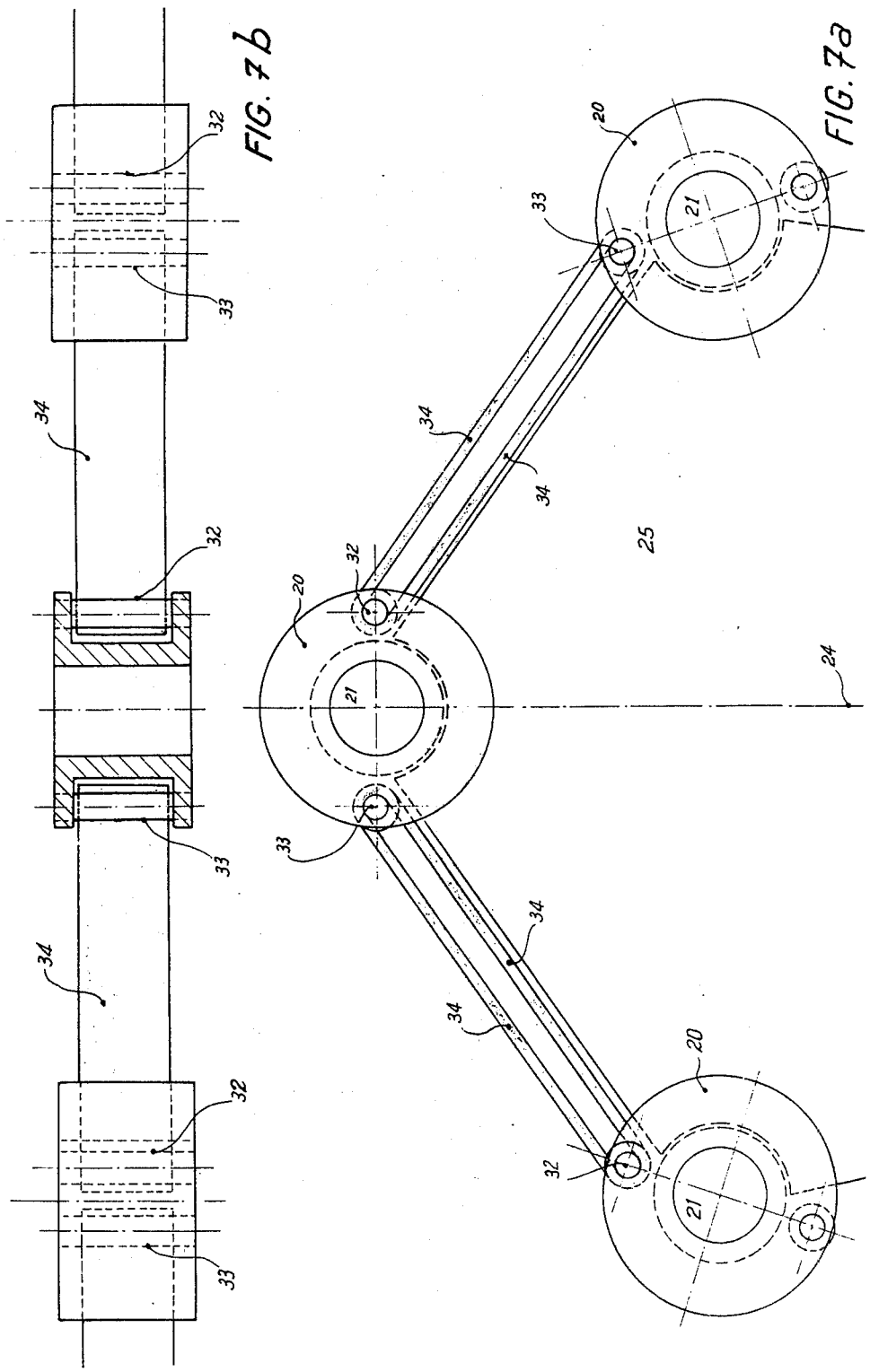

CIRULATING CONVEYOR

The invention relates to an installation for processing work, more particularly a continuously circulating process conveyor, equipped with work carriages.

Continuously circulating process conveyors are known in which the articles to be processed usually advance in a horizontal plane at a strictly uniform speed. Machines of this type are described, for example, in French Patent Specifications Nos. 1,089,258 and 2,164,052. These machines consist essentially of a plurality of processing drums which rotate about vertical axes and on each of which at least one of the processing operations for the article is carried out, the processing drums being interconnected by transfer drums which also turn on vertical axes. The peripheral speeds of the processing and transfer drums are the same, and each of them has compartments equispaced along its circumference so that each compartment in the transfer drum comes opposite each compartment in the processing drum in succession. As a result an article can be transferred from a compartment in a transfer drum into a compartment in a processing drum, then into a compartment in a transfer drum again, and so on until the article has passed successively through all the transfer and processing drums making up the machine and has been subjected, during its periods on the processing drums, to the various successive processing operations provided.

In these machines the articles are usually placed not directly in the drum compartments, but on carriages which in turn are placed directly in the compartments.

The advantages of continuously circulating process conveyors in which the articles advance continuously at a constant speed, as compared with machines of the discontinuous type in which the articles are halted at work stations for the time required to carry out the processing operation concerned, are well known. The advantages reside chiefly in the elimination of inertia forces due to changes of speed, making it possible to maintain high rates of advance with reduced energy consumption and also less wear on the components of the machine, and protecting the articles processed from deterioration due to sudden acceleration or deceleration. This combination of advantages has permitted the construction, particularly for processing articles manufactured in extremely large quantities, of continuously circulating conveyors whose outputs far exceed those of conventional discontinuous machines.

However, continuously circulating conveyors of the type described suffer from various constraints and limitations which prevent their inherent advantages from being exploited to the full. The general drive mechanism for the machine, which must work each processing drum and each transfer drum, is fairly complicated. The circuit followed by the articles as they pass through the machine cannot be arbitrary, but must necessarily consist of a series of interconnecting arcs of circles. Since technical reasons put a lower limit to the original diameter of the transfer drums and the spacing of these drums, the arc followed by the articles on the rocessing drum is restricted to a relatively small proportion of this drum's circumference. The various "modules" or units in the machine, each consisting of a processing drum and of the transfer drum which supplies it, must necessarily be adjacent, which restricts the dimensions of these units and of the drums which constitute them.

Lastly, the machine forms an assembly whose various parts are necessarily connected together by positive transmission means, so that when a difficulty occurring in one part of the machine necessitates halting the machine, the halt must, for fear of grave consequences such as the breakage of components or articles, be communicated to all parts of the machine within a very short time, thereby greatly complicating the design of the safety devices.

An object of the invention is to overcome these disadvantages and to provide continuously circulating process conveyors with features which release them from constraints and limitations such as those just listed and which permit full use to be made of the inherent advantages of continuous circulation.

To this end, the invention consists of an installation for processing work comprising work carriages, more particularly a continuously circulating process conveyor comprising at least one processing drum of which peripheral compartments receive work carriages, the installation being characterised in that each work carriage is linked to the following work carriage by a connection of which the length between any two consecutive carriages is always substantially the same and which is disposed so that the various carriages can be oriented differently from one another about axes perpendicular to their plane of advance.

According to another feature of the invention, the connection between two successive work carriages has some longitudinal resilience.

A continuously circulating process conveyor embodying the invention is free of the constraints and limitations of the known machines of the type. Its overall drive mechanism is much simpler since only the processing drums require to be driven, whereas the transfer drums can be mounted loosely on their pivots and will be drawn along by the series of carriages linked by connecting devices. The route of the articles through the machine need not consist entirely of interconnecting arcs of circles, but can have rectilinear portions. The reversing drums can be much smaller in diameter, and they can be so sited relative to the processing drums that the path followed by the articles round the periphery of each processing drum exploits most of this drum's circumference. It is no longer necessary to hold the articles in the compartments of the processing drums by means of fixed guards. The processing drums of the machine can be far apart, and so their dimensions are not restricted. Finally, the reversing drums can be mounted on resilient return means, so that one processing drum can be stopped suddenly in the event of difficulty without thereby bringing the entire machine to an abrupt stop.

The invention will be described in more detail with reference to embodiments of work processing installations illustrated in the accompanying drawings, in which.

Figure 2:
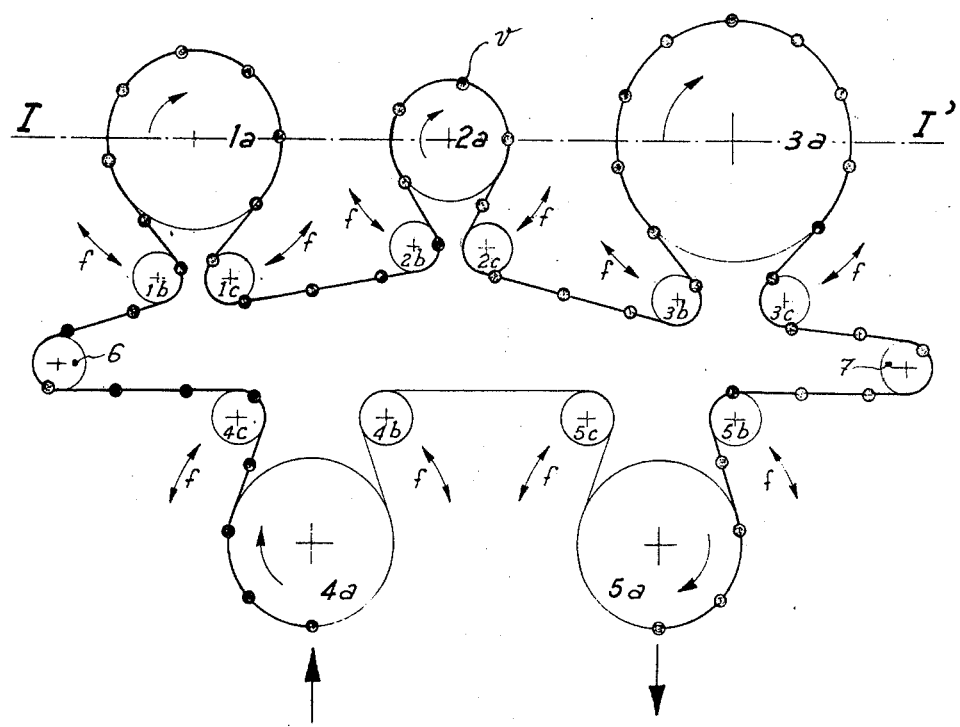
FIG. 2 is a diagrammatic general plan view of a continuously circulating process conveyor embodying the invention.
Figure 3:
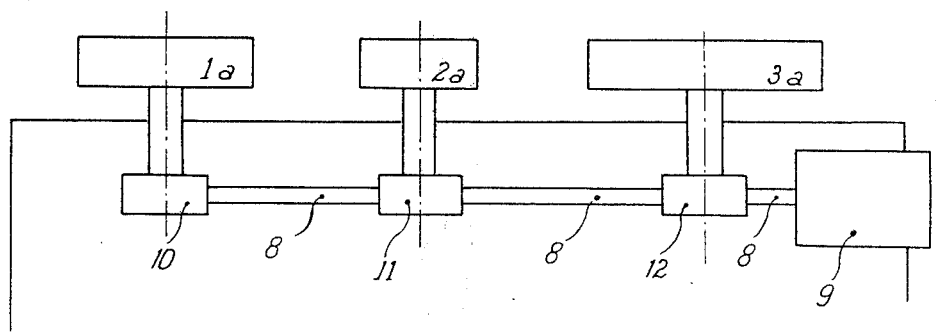
Figure 4:
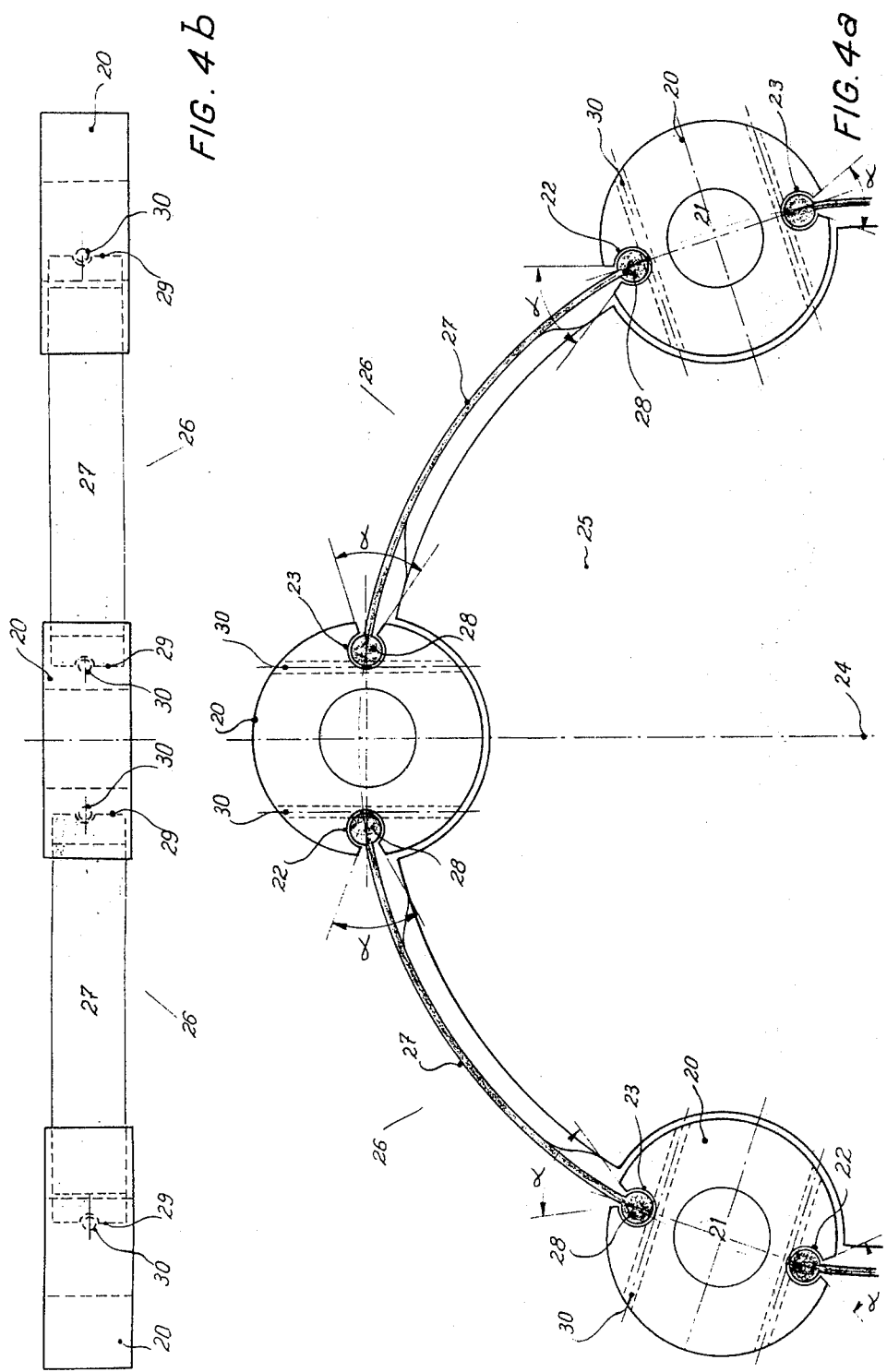
Figure 5:
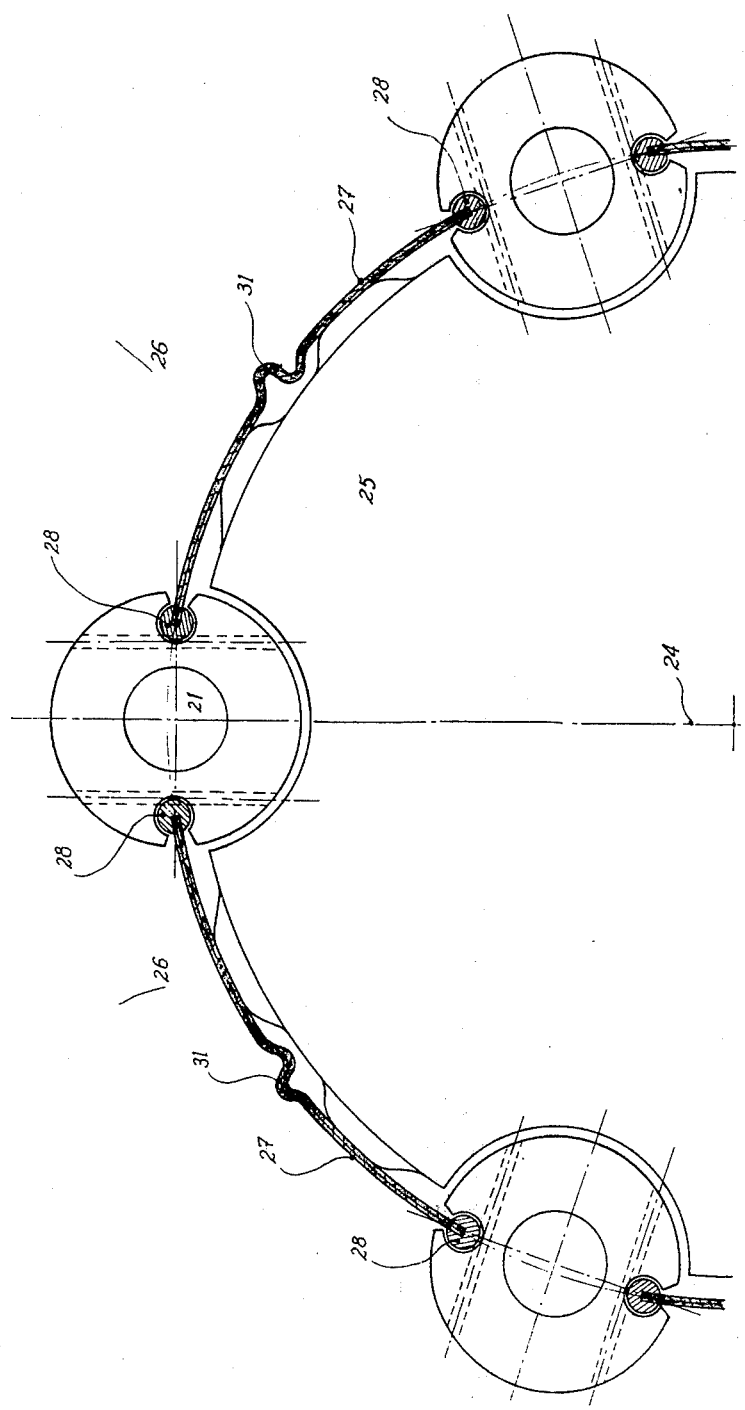

FIG. 3 is a diagrammatic general view of the machine shown in FIG. 2, showing the drive mechanism for the drums of the machine; for simplicity's sake the various carriages have been omitted from FIG. 3; and FIG. 4a is a partial plan view showing a work processing conveyor embodying the invention travelling around a portion of a drum and in which the connecting members between successive work carriages are flexible and slightly extendible belts with enlarged end portions fitting into sockets in the work carriages;

FIG. 4b is an elevational view of the work processing conveyor and drum of FIG. 4a;

FIG. 5 is a partial plan view showing a second embodiment of the invention in which the connecting members between successive carriages have transverse corrugations therein to provide longitudinal resilience;

FIG. 6a is a partial plan view of a third embodiment of the invention in which the connecting members between successive carriages comprise a pair of parallel loops;

FIG. 6b is an elevational view of the work processing conveyor and drum of FIG. 6a;

FIG. 7a is a partial plan view of a fourth embodiment of the invention in which the connecting members between successive work carriages are wide loops engaging pivot pins and the drum may be flat sided; and FIG. 7b is an elevational view of the work processing conveyor and drum of FIG. 7a.

Figure 1:
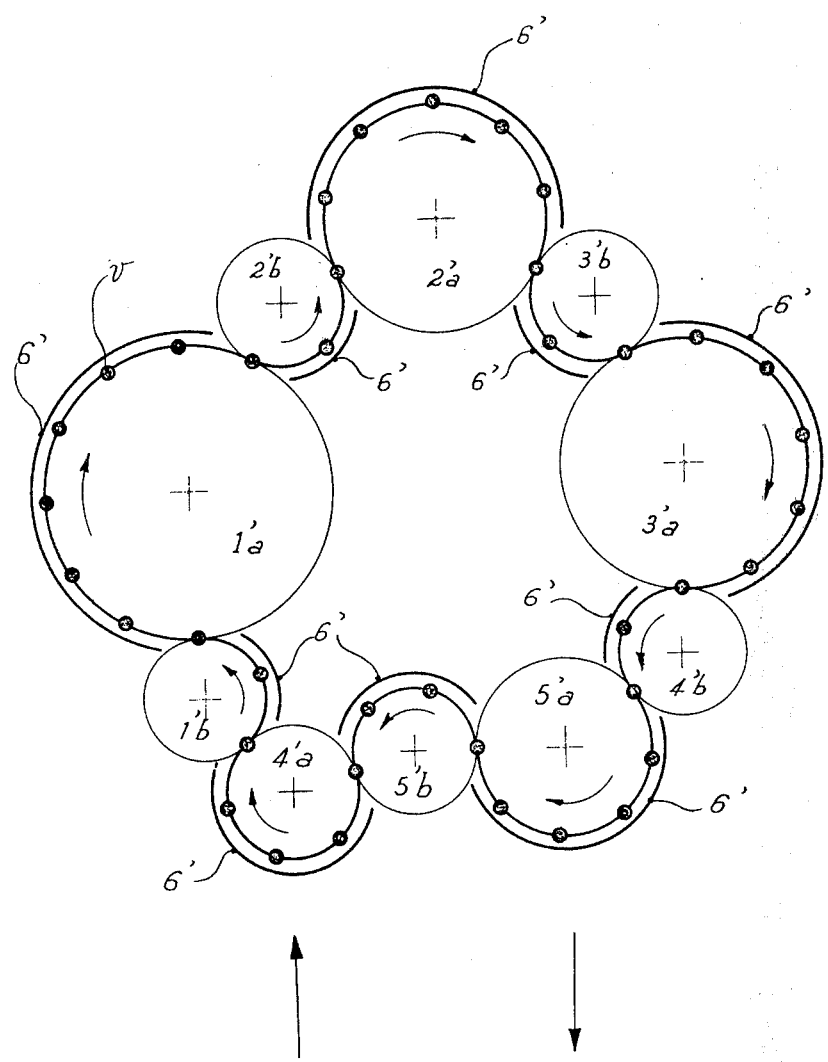
FIG. 1 is a diagrammatical general view from above of a conventional prior art continuously circulating process conveyor.

As FIG. 1 shows, a conventional continuously circulating process conveyor comprises a plurality of processing drums $1'a$, $2'a$ and $3'a$ and possibly a supply drum $4'a$ and a discharge drum $5'a$. The machine also has transfer drums $1'b$ to $5'b$ to interconnect the processing, supplying and discharge drums. Obviously, the machine could have a different number of processing drums from that shown in FIG. 1, in which case the number of transfer drums would differ accordingly.

Articles are placed on carriages $v$ which engage in compartments situated on the peripheries of the various drums. When the drive mechanism of the machine causes the drums to carry out uniform rotary motion about their vertical axes, the articles travel through the machine along a path consisting of interconnecting arcs of circles. The supply drum $4'a$ is supplied with articles in a known manner, for example by means of a rotating feed magazine or the like. Later the articles are extracted from the carriages and discharged from the machine at the discharge drum $5'a$, also in a known manner. The carriages are held in the compartments of the various drums by fixed guards $6'$.

Clearly, in a conventional machine like that shown in FIG. 1, the various processing drums cannot be sited completely arbitrarily, nor can they have any dimensions desired. It is equally clear both that the drive mechanism must ensure synchronous rotation of all processing drums, of the supply and discharge drums and of all transfer drums, and that all drums must be connected together by positive transmissions, none being able to stop suddenly without bringing all others to an abrupt halt.

Moreover, as FIG. 1 shows, the route followed by the work carriage involves only a relatively small proportion of the periphery of each processing drum $1'a$ to $3'a$, which restricts the time available for each of the operations to be carried out on each processing drum.

FIGS. 2 and 3 are diagrammatic illustrations of a continuously circulating process conveyor embodying the invention, with connecting devices between the various work carriages. To facilitate comparison of this machine and that shown in FIG. 1, there are again three processing drums $1a$, $2a$ and $3a$. In addition a supply drum $4a$ and discharge drum $5a$ are provided. Each of these drums is allocated two reversing drums $1b$ and $1c$ for the processing drum $1a$; $2b$, $2c$ for the processing drum $2a$; $3b$, $3c$ for the processing drum $3a$; $4b$, $4c$ for the supply drum $4a$; and $5b$, $5c$ for the discharge drum $5a$. In addition to the reversing drums $1b$, $1c$ to $5b$, $5c$ just listed, which are linked two at a time with the processing, supply or discharge drums, there may be further reversing drums which are linked neither to a processing drum nor to a supply or discharge drum, and whose role is to permit changes in the route followed by the series of work carriages. Thus the machine shown in FIG. 2 has two of these reversing drums, bearing reference numerals 6 and 7. The series of work carriages describes a closed circuit consisting of straight lines and of circular arcs and embracing a substantial part of the periphery of each of the above-mentioned drums.

The articles to be processed are fed to the supply drum $4a$, for example by a conventional rotating feed magazine or the like. They then follow the path imposed on the series of work carriages and are subjected to various successive processing operations carried out where this path coincides with the peripheries of the processing drums. The articles are dischaged from the discharge drum $5a$.

The machine embodying the invention as shown in FIGS. 2 and 3 is simpler than the conventional machine shown in FIG. 1, firstly, because it does not need fixed guards to hold the carriages in the compartments of the drums, this being done automatically because the vehicles are all interconnected.

Another simplification relates to the drive mechanism for the machine. Whereas the drive mechanism for the machine shown in FIG. 1 must provide a synchronised drive for all the processing drums and for all the transfer drums, the mechanism for the machine embodying the invention and shown in FIGS. 2 and 3 is required only to rotate the processing drums or even, possibly, one of the processing drums, the other processing drums and the reversing drums being mounted loosely on their pivots and entrained by the series of work carriages as they successively engage them.

Even where it is necessary to drive all the processing drums, this can be arranged extremely easily, as illustrated in FIG. 3. Whereas in FIG. 1 the processing drums could not be arranged as desired and in paticular, especially when these drums are of different sizes, could not be arranged in a line without unacceptably reducing their accessibility, no constraint of this kind applies to the machine embodying the invention. In the latter machine the axes of the various processing drums may easly be aligned with one another, and it is then possible, as FIG. 3 shows, to drive them all by means of a single horizontal shaft 8 rotated by a single motor 9 and driving each of the vertical shafts for the processing drums through bevel gears 10, 11 and 12. The lengths of shaft 8 separating the various bevel gears can be as desired, as can the spacing between the processing drums, and some of these drums may have large dimensions very different from those of the neighbouring processing drums, without thereby reducing the accessibility of the latter.

In the conventional machine illustrated in FIG. 1 all the drums, whether for processing or for transfer, are closely associated with one another by the positive drive mechanism. An abrupt halt by any drum therefore brings the entire machine to a sudden stop and may, due to the inertia brought into play, lead to damage such as breakage of parts of the machine. In a machine embodying the invention, however, the vertical pivots of the reversing drums may be mounted on a device which permits them to oscillate parallel to themselves, for example a lever pivoted on a vertical axis. Each of the reversing drums therefore has some degree of liberty, indicated by arrows f in FIG. 2. During normal operation of the machine a return spring holds each reversing drum at one end of the stroke permitted by this degree of liberty. If any of the processing, supply, discharge or transfer drums suddenly stops, this now results, not in immediate abrupt stopping of the other drums, but in shifting of some reversing drums, so that an automatic monitoring device alerted by the abrupt stopping of the processing drum has time to transmit a signal to stop the entire machine before damage such as the breaking of work or parts is able to occur.

In the machine embodying the invention the reversing drums do not exert any driving action on the series of work carriages. These drums can therefore have very small diameters, and may even consist of simple discs without peripheral compartments, in which case the various interconnected carriages bear on the outer circumferences of the discs. The axes of two reversing drums associated with a single processing drum may therefore be very close together, and as a result the series of interconnected carriages can cooperate with most of the periphery of the processing drum (FIG. 2). This advantage of the machine embodying the invention over the conventional machine is very important, since it means that more time is available on each processing drum for processing the article, and this in turn means, for a given process involving operations of a given duration to be applied to articles advancing at a given rate, a reduction in the dimensions of the processing drums and consequently in the overall dimensions of the machine.

Thus it will be appreciated that the use of a continuously circulating process conveyor with connections in accordance with the invention between the work carriages eliminates most of the constraints associated with conventional machines of the type and offers great flexibility in the arrangement of the various parts of the machine. In particular, alignment of the machine's processing drums as shown in FIG. 2 is only one example, and completely different arrangements are possible within the scope of the invention.

FIGS. 4 to 7 illustrate, by way of example only, different ways of connecting the work carriages in accordance with the invention.

FIGS. 4a and 4b show work carriages 20 containing a central bore 21 to house the work (not shown). Each work carriage contains two diametrically opposite through bores 22, 23 of circular cross-section, connected to the outer periphery of the vehicle by a slot defined by two planes passing through the axis of the bore 22 or 23 and forming an angle α between them. The axes of the bores 22, 23 and of the bore 21 should be parallel to the axes of rotation 24 of the drums 25.

The connection between two successive vehicles is made by a member 26 having a central portion 27, in the form of a flexible and slightly extendible belt whose width substantially equals the height of the carriages, and two end portions 28 in the form of right-cylindrical enlarged portions whose lengths equal the width of the central belt 27 and whose axes are perpendicular to the longitudinal axis of symmetry of the belt 27 and substantially coincide with the axes of the bores 22, 23. In the extension of the longitudinal axis of symmetry of the portion 27, the cylindrical enlarged portions 28 are provided, on the side remote from the portion 27, with slots 29 which enable the enlarged portions 28 to be locked in the bores 22, 23, parallel to the axes of these bores, by means of pins 30. There is considerable play between these pins and the enlarged portions 28, so as not to interfere with rotation of the ends 28 about their axes in the bores 22, 23. However, this rotation is limited to an angular amplitude by the range of motion of the central portion 27 relative to the carriages 20. Two consecutive carriages 20 can therefore pivot relative to each other through the angle α, even if the central belt 27 is rigid. Since this belt is preferably flexible, the pivoting of two consecutive carriages 20 relative to one another may greatly exceed the angle α. This ability of the carriages to pivot relative to each other enables all the necessary changes of direction to be imparted to the path followed by the series of carriages, and also enables the series of carriages to be wrapped round even drums of small diameter.

In the embodiment shown in FIGS. 4a and 4b the connecting member may advantageously be a single component of flexible synthetic plastic material, such as a polyamide or polypropylene, whereas the carriage may be of metal or also of synthetic plastic material, as appropriate. The use of a synthetic plastic material for the connecting member 26 gives this member some resilience under tensile stress, so that it can compensate for drum manufacturing tolerances in respect of the distances between the centres of compartments, and can ensure correct positioning of the successive carriages in the compartments.

In some cases the intermediate belt 27 of synthetic plastic material may be reinforced with metal wire or glass fibres parallel to the longitudinal axis of symmetry of the belt, to improve the belt's tensile strength. This naturally reduces the longitudinal resilience of the member 26, but does not remove it altogether, on account of the thicknesses of plastic material remaining between the reinforcement and the surfaces by which the member 26 bears on the carriages. A balance between the resilience desired of the member 26 and the improved resistance of this member to tensile stresses can therefore be struck by selecting suitable internal reinforcements for the member according to its application.

FIG. 5 illustrates a variant of the connecting member embodying the invention, very similar to the embodiment shown in FIGS. 4a and 4b but more suitable for a metal connecting member.

The central portion 27 in the embodiment shown in FIG. 5 is made of flexible metal strip, possibly with transverse corrugations 31 to give it some longitudinal resilience. This central belt 27 is connected at its ends to two cylindrical members 28, also of metal, the connection being made by welding, rivetting or any other appropriate means.

FIGS. 6a and 6b illustrate a third interconnection embodying the invention. In this case the tops and undersides of the carriages 20 bear two diametrically opposite studs 32, 33, whose axes are parallel to that of the central bore 21 and to the rotational axes 24 of the drums 25. In addition the two studs 32 on the top and underside of each carriage are coaxial, as are the two studs 33 on the same carriage. These four studs 32, 33 bear heads 32', 33' greater in diameter than the bodies of the studs.

The studs 32, 33 on the tops of two consecutive carriages 20, on the one hand, and the studs 32, 33 on the undersides of the same carriages, on the other, are connected together by respective loops 34. The loops 34 are relatively flexible. They are held on the studs 32, 33 by the heads 32', 33', whose diameters exceed those of the bodies of the studs sufficiently to prevent the loops 34 from escaping, even when the distance between the carriages diminishes slightly within the limits permitted by the constructional characteristics of the machine. Thus the loops 34 provide between the consecutive carriages connections which permit the carriages to pivot relative to each other and which also permit some variation in the distance between two consecutive carriages. The loops 34 may advantageously be of synthetic plastic material, preferably reinforced in the longitudinal direction, but may alternatively be of metal. In the latter case there are two options: they may be either rigid metal loops, or flexible metal loops made of thin strip.

FIGS. 7a and 7b illustrate a variant in which the carriages 20 are shaped like diabolos flanged spools or cottonseeds. A cross-section through these carriages along a central vertical plane, as shown at the centre of FIG. 7b, is shaped like a double T. The members 32, 33 are not studs as in FIGS. 6a, 6b, but pivot pins which join together the upper and lower flanges of the carriages 20. A loop 34 wrapped round these pivot pins joins two successive carriages. The width of the loop is almost equal to the length of the free portions of the pivot pins 32, 33. The drum 25 in FIG. 7a has flat sides, to avoid forcing the loops 34 to curve. However, it is not essential for the drum 25 to be flat-sided; instead the loops 34 may curve to some extent, bearing on the periphery of the drum.

The variant illustrated in FIGS. 4 to 7 are only a few examples of all the possible connections between work carriages embodying the invention, and other embodiments may be added to these without thereby exceeding the scope of the invention.

I claim:

1. A continuously circulating work processing conveyor including a plurality of spaced identical work carriages interconnected by connecting members each extending from the rear of a work carriage to the front of the following work carriage, said work processing conveyor being adapted for use in a machine having at least one rotating processing drum with peripheral compartments in said drum for receiving said work carriages as said conveyor travels partially around said drum, each work carriage having a central compartment for carrying the work, said compartment being open in a direction parallel with the axis of rotation of the drum, each carriage also having a front and a rear pivot bore located respectively at the front and rear of the carriage, each such pivot bore having its axis extending parallel to the axis of rotation of the drum, each such front and rear pivot bores communicating through a respective associated slot with the exterior of the carriage at the front and rear thereof, respectively, each connecting member having the form of a belt whose width substantially equals the height of the carriages, each such belt having a right-cylindrical enlarged portion at each end thereof inserted respectively into the rear pivot bore of one carriage and into the front pivot bore of the following carriage with the belt extending through the associated slot, and said enlaged portions of each belt being retained in the respective pivot bores by transverse pins while permitting each such enlarged portion to pivot about its axis to the extent permitted by movement of the belt in the associated slot.

2. A continuously circulating work processing conveyor, as claimed in claim 1, in which each of said slots has two sides diverging at a predetermined angle toward the exterior of the carriage, and the two sides of each diverging slot act as stops engaged by the belt to limit the pivot motion of the enlarged portion thereof in the pivot bore.

3. A continuously circulating work processing conveyor, as claimed in claim 1, in which said belt and the right-cylindrical enlarged portion at each end thereof is made in one piece of flexible synthetic plastic material.

4. A continuously circulating work processing conveyor, as claimed in claim 3, in which said belt is reinforced longitudinally with fibre material.

5. A continuously circulating work processing conveyor, as claimed in claim 1, in which said belt is made of metal, and said right-cylindrical enlarged portions are right-cylindrical metal members secured to the end of the belt.

6. A continuously circulating work processing conveyor, as claimed in claim 5, in which said metal belt has transverse corrugations for increasing its flexibility and longitudinal resilience.

7. A continuously circulating work processing conveyor including a plurality of spaced work carriages interconnected by connecting members each extending from the rear of a work carriage to the front of the following work carriage, said work processing conveyor being adapted for use in a machine having at least one rotating processing drum with peripheral compartments in said drum for receiving said work carriages as said conveyor travels partially around said drum, each work carriage having two pairs of studs thereon, all of said studs having their axes parallel with the axis of rotation of the drum, one pair of studs being at the front of the carriage at the top and underside thereof and the other pair of studs being at the rear of the carriage at the top and underside thereof, each connecting member having the form of a loop, two of said loops serving to interconnect the rear of one carriage with the front of the following carriage at the top and underside of each carriage respectively by engaging the respective studs at the top and underside thereof.

8. A continuously circulating work processing conveyor, as claimed in claim 7, in which said loops are made of flexible material.

9. A continuously circulating work processing conveyor including a plurality of spaced work carriages interconnected by connecting members each extending from the rear of a work carriage to the front of the following work carriage, said work processing conveyor being adapted for use in a machine having at least one rotating processing drum with peripheral compartments in said drum for receiving said work carriages as said conveyor travels partially around said drum, each of said work carriages having the shape of a flanged spool with a front and a rear pin extending between the flanges, each pin having its axis parallel with the axis of rotation of the drum, and each said connecting member being a loop passing around the rear pin on one carriage and the front pin on the following carriage.

* * * * *